June 6, 1939. J. A. CERNY 2,161,773
THERMOSTATIC VALVE MECHANISM
Filed Oct. 1, 1936 2 Sheets-Sheet 1

INVENTOR
JOSEPH A. CERNY
BY
Brockett, Hyde, Higley + Meyer
ATTORNEYS

June 6, 1939. J. A. CERNY 2,161,773
THERMOSTATIC VALVE MECHANISM
Filed Oct. 1, 1936 2 Sheets-Sheet 2

INVENTOR
JOSEPH A. CERNY
BY
ATTORNEYS

Patented June 6, 1939

2,161,773

UNITED STATES PATENT OFFICE 2,161,773

THERMOSTATIC VALVE MECHANISM

Joseph A. Cerny, Cleveland, Ohio, assignor to William T. Bentley, Cleveland Heights, Ohio Application October 1, 1936, Serial No. 103,563

6 Claims. (Cl. 236—48)

This invention relates to thermostatic snap action mechanism, such as is used for regulating the supply of fuel to a burner for heating purposes.

One object of the invention is to provide improved thermostatic control mechanism which is of simple construction capable of manufacture at low cost, which is reliable in operation and capable of convenient adjustment or regulation, and which is not liable to get out of order in use.

A further object of the invention is to provide improved thermostatic control mechanism of the "snap action" type which is so constructed and arranged as to be capable of calibration to substantially any degree of sensitiveness within reasonable limits, in which the parts are of symmetrical form and so arranged as to reduce friction and wear and also capable of assembly in relatively small compass so as to reduce the overall size of the completed device.

A further object of the invention is to provide thermostatic control mechanism of the character described in which the parts are capable of construction and assembly in their working positions by very simple and convenient operations, and are of such form as to be substantially unaffected by the ordinary wear and tear to which they are subjected in use and are consequently reliable in operation over a long period of time.

Further objects of the invention are in part obvious and in part will appear more in detail hereinafter.

Figure 1:
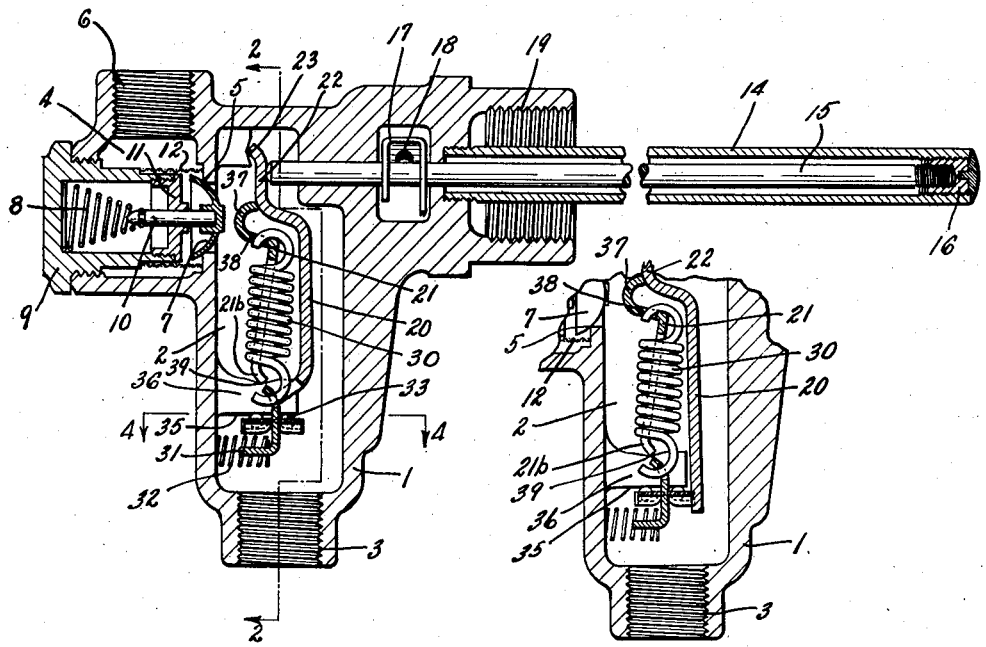
Figure 3:
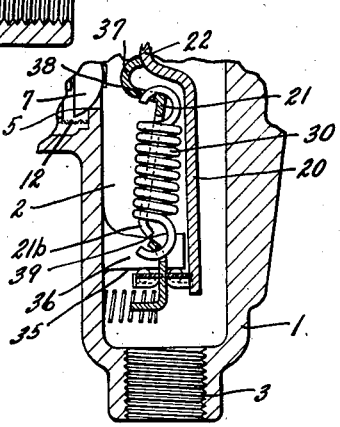
Figure 2:
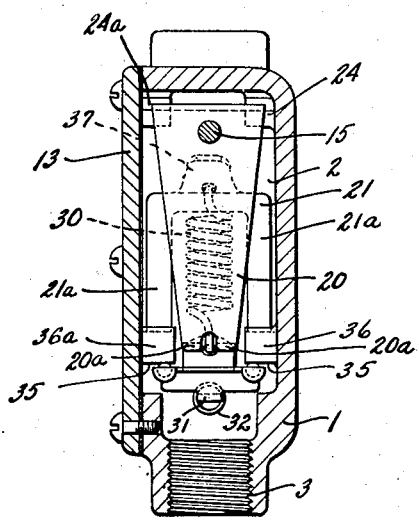
Figure 4:
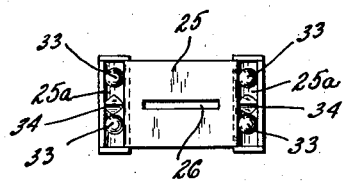
Figure 5:
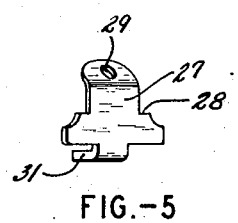
Figures 6, 8, 9:
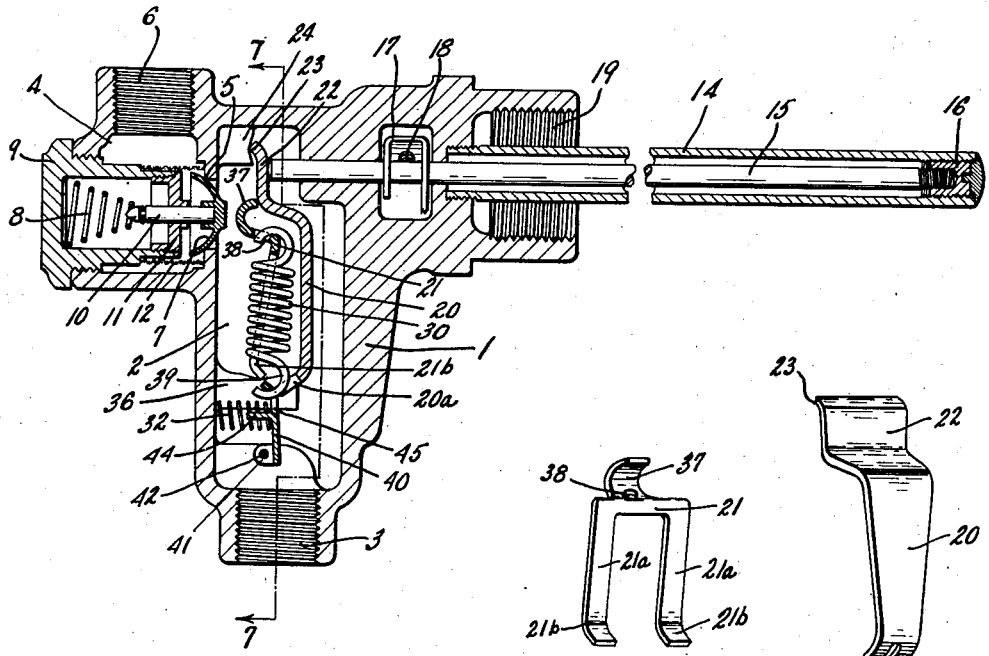
Figures 7, 10:
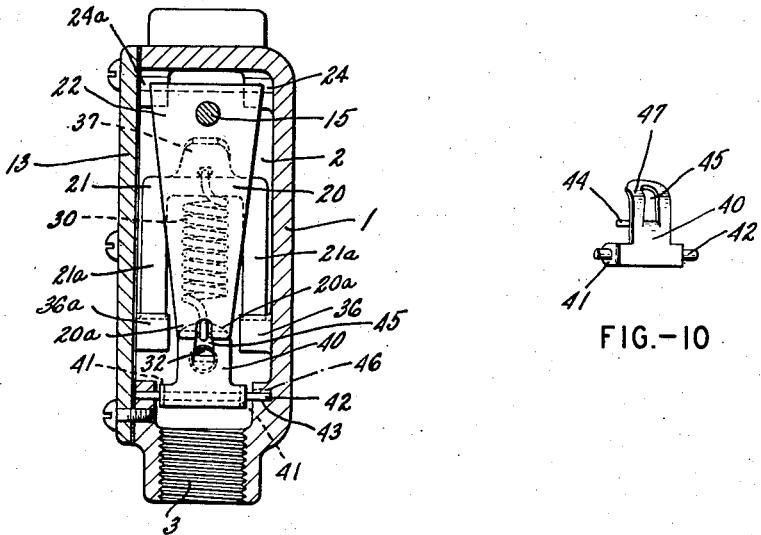

In the drawings, Fig. 1 represents a longitudinal sectional elevation through one form of mechanism embodying the invention; Fig. 2 is a sectional elevation on the line 2—2, Fig. 1; Fig. 3 is a detail view, corresponding to Fig. 1, and illustrating a modification; Fig. 4 is a detail sectional plan view, on the line 4—4, Fig. 1, illustrating the movable carriage; Fig. 5 is a detail perspective view of that member of the carriage to which the main spring is attached; Fig. 6 is a view corresponding to Fig. 1 and illustrating another embodiment of the invention; Fig. 7 is a sectional elevation on the line 7—7, Fig. 6; Fig. 8 is a detail perspective view of the valve actuating lever; Fig. 9 is a similar view of the main lever; and Fig. 10 is a perspective view of the movable carriage shown in Fig. 6.

While the invention is capable of use for any purpose such as for operating electric switches or where the flow of fuel for heating purposes is to be controlled, such as industrial furnaces or boilers, space heating apparatus, such as household furnaces or other devices, one common use of the mechanism is for controlling or regulating the temperature of the heated water for a domestic hot water supply system in which the water is heated by gas. Such a device is illustrated in the drawings. 7 indicates the part whose motion or position is to be controlled. Where the control mechanism is used for electric circuits this part will be connected to a suitable electric switch, but in the drawings part 7 is shown as a gas valve. The control mechanism includes a suitable casing or body member 1, usually a bronze casting cored out to provide an elongated chamber 2 provided at one end with a threaded opening 3 through which gas flows to the heating burner, said chamber being separated from a gas supply chamber 4 in a lateral extension of the housing by a valve seat 5. The chamber 4 communicates with a threaded opening 6 to which is connected the gas supply pipe (not shown). Cooperating with the seat 5, and therefore controlling the flow of gas from the inlet opening 6 to the outlet opening 3 is a suitable valve device, such as the valve member 7 lightly held to its seat by a compression spring 8 within the sleeve of a cap 9. The stem 10 of the valve slides in an end head 11 and surrounding said valve is a filter screen 12.

Cap 9 with its attached parts, including the valve, its stem and spring, and head 11 and screen 12 may be unscrewed and removed as a unit from the housing for repair or replacement and to afford access to the valve seat when necessary. Also, while the chamber 2 is usually contained wholly within the housing 1, it is open over its entire length on one face where it is closed by a removable cover 13 of plate form. All the parts of the operating mechanism may be inserted into or removed from chamber 2 when this plate-like cap is removed.

Substantially opposite the valve 7 and nearly in line therewith and movable in the same direction as the valve is the thermostatic device utilized to operate the mechanism. This thermostatic device comprises two thermostatic elements, to-wit, an expansible member, such as the copper tube 14, threaded into an extension of the housing and within which is contained a relatively non-expansible member, such as the steel or porcelain rod 15. The inner end of said rod extends into chamber 2 opposite valve 7 and its outer end is threaded into a plug 16 threaded into tube 14. This plug may be adjusted back and forth along its threads for a proper initial setting of the mechanism, as is usual. Also, the rod 15 is provided with operating means, such as an arm 17 attached to it by a set screw 18 and accessible from the outside of the casing for manipulation to vary the temperature to which the thermostatic mechanism is responsive. The casing 1 is threaded at 19 for attachment to a fitting on the wall of a water container, such as a domestic hot water tank, with the thermostatic elements 14, 15 extending into the water and sensitive to the temperature thereof.

The operating mechanism connecting the thermostatic elements for actuation of valve 7 is as follows:

20 indicates a main lever and 21 a secondary or valve actuating lever. Both of these levers are preferably made of pressed sheet metal cut and stamped or pressed to proper shape and form and therefore capable of manufacture at low cost.

The main lever 20 at one end is bent out of the plane of its body portion to form an offset end portion 22 of substantial width and arranged for pivotal connection to the body or casing 1. This may be a pin pivot but is usually a knife-edge pivot, the knife edge being formed by slightly bending the extreme end portion of the metal out of the plane of the offset 22, as indicated at 23, so that one of the transverse edges of the metal where it is sheared or cut off square at its end in the original formation of the blank becomes a knife edge presented normally from the general plane of the lever as a whole, thereby requiring no special grinding or shaping of a special knife-edge for pivoting purposes, as is usual. This knife-edge of the lever rests upon aligned seats or bearings 24, 24a in internal bosses cast in the body, the said seats being fairly close to the axis of rod 15 to shorten the leverage, as will be readily understood. At its opposite end main lever 20 is formed in suitable manner to engage a movable carriage or motion transmitting member, two forms of which are shown in the drawings.

In Fig. 1 the carriage comprises a body member 25 of plate-like form provided with an elongated slot 26 and at each end shaped to form pockets or cups 25a, such as by bending the metal into channel form. Extending fairly loosely through the slot 26 is a plate-like member 27 provided with shoulders 28 abutting the under surface of plate 25 beyond the ends of slot 26, the upper portion of plate 27 being provided with an opening 29 to receive one end of a strong coiled tension spring 30. The lower portion of member 27 is bent laterally to form a tongue 31 upon which is sleeved one end of a compression spring 32, the opposite end of which abuts the wall of the casing.

In each of the pockets 25a are located one or more (two being shown) of anti-friction members such as balls 33, preferably held separated from each other in any suitable manner, such as by teats 34 punched upwardly from the bottoms of the pockets 25a. The balls 33 roll along smooth or finished under surfaces 35 of solid abutments 36, 36a, separated from each other but each cast integrally with the metal of the body 1. The upper arm of plate 27, of course, lies and travels between the two abutments 36, 36a. Spring 30 extends along one face of the main lever 20 and lies between the arms 21a of the valve actuating lever 21, which is generally of U-form as shown in Fig. 8, but said lever is provided at its head end with a curved extension 37, the arch of which lies directly opposite the center of valve 7 and the end of which lies opposite the offset portion 22 of the main lever, as shown in Fig. 1. Said extension is also provided with suitable means, such as the opening 38 for attachment to it of the other end of spring 30.

Lever 21 is arranged for pivotal connection to the stationary casing 1. This may be a pin pivot, but in the arrangement shown the connection is by a knife-edge pivot, for which purpose, just as in the case of lever 20 the end portions of the arms 21a are bent slightly out of their plane, as at 21b, so that one edge of the metal at the end of each arm forms a knife edge presented endwise from the lever as a whole, the knife edges on the two lever arms resting in seats or bearings 39 in the upper faces of the abutments 36, 36a.

With this arrangement the bottom surfaces 35 and upper surfaces 39 of abutments 36, 36a and the bearing surfaces or seats on the abutments 24, 24a, may be readily formed or finished by a single broaching operation with a single tool, as will be readily apparent.

Main lever 20 is made effective upon the movable carriage to which the spring 30 is connected, by forming and locating the free end of the main lever in suitable manner to abut the carriage on that face of its plate 27 opposite to the spring 32. As shown in Figs. 1 and 9, the lower or free end of the main lever 20 is bifurcated and bent out of its plane to form two fingers 20a, straddling that turn of the spring 30 which is connected to the carriage and abutting the upwardly extending portion of plate 27 of the carriage. Fig. 3 illustrates another arrangement in which the free end of the main lever 20 is unbent or plain and extends down alongside of and abuts the edge of the plate 25.

The operation is as follows:

Fig. 1 shows the parts in their positions when the device being heated is up to or above the desired temperature. In other words, no heat is demanded. Therefore valve 7 is closed and lever 21 is in its off position with its free end abutting the main lever 20. A line drawn from the point of connection of spring 30 to plate 27 to the connection of the opposite end of said spring to lever 21 lies at the right, in Fig. 1, of the knife-edge pivot of lever 21. The movable carriage is lightly pressed by the spring 32 against the lever 20, either against the end of its fingers 20a in Fig. 1, or by pressure of the edge of plate 25 against the flat surface of lever 20 in Fig. 3. As the device to be heated cools, such as by cooling of the water in a domestic hot water tank, the copper tube 14 contracts and rod 15 moves to the left in Fig. 1. This swings main lever 20 in the clockwise direction Fig. 1 until the line aforesaid, connecting the two ends of spring 30, passes to the left of the knife-edge pivot of lever 21. When that occurs or, in other words, when the dead center is passed, lever 21 is snapped to the left, its arched upper end portion moving over and abutting valve 7 and moving it to the left in Fig. 1 to fully open position. This operation, of course, compresses spring 32. It also supplies gas to the burner and when the temperature of the water rises sufficiently a contrary effect occurs, tube 14 expanding and causing movement of rod 15 to the right, with corresponding motion of lever 20, accompanied by return movement of the movable carriage as the result of the compression of spring 32. Again, when the dead center is passed, lever 21 is snapped over to the right or to the position shown in Fig. 1, thereby permitting the valve to close.

Lever 20 is subjected to two forces, to wit, to the pressure of rod 15 in one direction and to the pressure upon it of the movable carriage as the result of the compression of spring 32. In the form shown in Fig. 3 the pressure of the lever upon the movable carriage is applied in substantially the plane of the surfaces 35 along which the balls roll with substantially no tendency to turn or cock the carriage from its normal position. In both forms lever 21 is subjected to the effect of but a single spring, extending longitudinally along its center and tending to hold it firmly with equal pressure of both of its legs upon the seats in which they pivot and with no tendency toward twisting or askew movement. The balls or antifriction members 33, of course, reduce friction of the moving carriage along the surfaces on which it travels.

This device may be readily calibrated to a high degree of sensitivity. In these instruments sensitivity depends to a large degree upon the closeness of the point of connection of spring 30 with the movable carriage to the line of the pivotal mounting of lever 21 in the casing, or in other words, to the line of the knife-edge pivot of said lever. The nearer one is to the other the more sensitive is the device. Sensitivity may be readily increased, if the device is too insensitive, by taking out the plate 27 from its slot in plate 25 and filing off more or less the shoulders 28 which abut the under surface of plate 25, thereby permitting the point of connection of the spring to more closely approach the knife-edge pivot of lever 21 in the casing.

The actual point of application of lever 20 to the movable carriage is more or less immaterial, affecting only the amount of multiplication of the lever movement as between the amount of motion of rod 15 and the amount of motion of the carriage produced thereby.

Figs. 6 and 7 illustrate a modification differing only from the form shown in Fig. 1 as to the form of the movable carriage. The movable carriage in this arrangement is a single member of plate form, shown in detail in Fig. 10. It comprises a body portion 40, the lower portion of which is bent to form two ears 41 pierced to receive a pivot pin 42 mounted in openings 43 in solid bosses of the body 1. The upper portion of plate 40 is punched out to form a tongue 44, forming a perch for the compression spring 32 and corresponding to the tongue 31, Fig. 1. The slot 45 formed by punching out said tongue provides an opening for attachment of the spring 30, and just as in Fig. 1 the upper end of plate 40 is bent slightly laterally, as at 47, to present a knife edge to the turn of spring passed through said opening.

The operation of this device is the same as that of the form before described, differing only in that the main lever 20 here produces swinging motion in one direction of the carriage around its pin pivot, its swinging motion in the opposite direction being produced by the spring 32. Sensitivity is readily varied, such as being increased, by more or less filing or broaching out the openings 43 or those in ears 41 which receive the pivot pin 42, such as by filing out said openings 43 above the pin, as indicated by the dotted lines at 46, thereby raising the pivot pin in Fig. 7 and bringing the point of connection of spring 30 to the movable carriage closer to the knife-edge pivot of lever 21. In other words, sensitivity is here increased by increasing the sloppiness of the fit of the pivot pin in its opening.

With each of the levers 20 and 21, where they are formed for connection to any other part, such as where they have a knife-edge bearing in the casing or where arranged for connection to an end of spring 30 or where lever 20 is bent to form feet 20a engaging the carriage, it will be observed that the metal of the lever is shaped, by cutting or otherwise, to form a transversely extending square formed edge portion, the metal adjacent which edge portion is bent diagonally out of the general plane of the sheet to present two sharp edges, one in the direction of the plane of the sheet as a whole and the other normal to said plane, one of which edges may be utilized as a knife edge for its connection to another part. This is a very simple and convenient method of forming a knife edge suitable for use in the manner described, in the very act of originally forming or shaping the blank, without any special operative steps such as grinding, sharpening or the like.

It will also be observed that the movable carriage, consisting of the two sheet metal parts 25, 27 in Fig. 1, and 40 in Fig. 6, not only serves as a support for one end of the main spring 30, but also as a simple motion transmitting member, receiving motion from the main lever 20 and transmitting it to the spring for causing snap action of lever 21.

In all forms of the invention, when the cover 13 is removed the operating parts of the mechanism may be readily introduced into the cavity or chamber of the casing and there assembled and adjusted to proper operating condition. Access to said parts, when in situ, is convenient for purposes of adjustment, replacement, repair or cleaning.

Other advantages of the invention will be apparent to those skilled in the art.

What I claim is:

1. Thermostatic control mechanism, comprising a chambered casing provided with oppositely disposed spaced abutments, a generally U-shaped actuating lever provided with an operating head and having the free ends of its arms pivotally mounted upon one side of said abutments, a motion transmitting member mounted in the casing on the other side of said abutments and having a part arranged to travel back and forth between them, a tension spring lying between said arms and extending from said head to a point beyond the pivotal axis of the lever and there connected to the said part of said motion transmitting member, yieldable means for moving said motion transmitting member in one direction, an operating lever lying alongside the actuating lever, said operating lever at one end moving between said abutments and engaging the motion transmitting member and at the other end being pivotally mounted in the casing, and thermostatic means operatively effective upon said operating lever.

2. Thermostatic control mechanism, comprising a chambered casing provided with oppositely disposed spaced abutments, a generally U-shaped actuating lever provided with an operating head and having the free ends of its arms pivotally mounted upon one side of said abutments, a motion transmitting member mounted in the casing on the other side of said abutments and having a part arranged to travel back and forth between them, a tension spring lying between said arms and extending from said head to a point beyond the pivotal axis of the lever and there connected to the said part of said motion transmitting member, yieldable means for moving said motion transmitting member in one direction, and thermostatic means for moving it in the opposite direction, said motion transmitting member being formed of pressed sheet metal and shaped to provide pockets, and anti-friction members lying in said pockets and travelling along said abutments.

3. Thermostatic control mechanism, comprising a chambered casing provided with oppositely disposed spaced abutments, a generally U-shaped actuating lever provided with an operating head and having the free ends of its arms pivotally mounted upon one side of said abutments, a motion transmitting member mounted in the casing on the other side of said abutments and having a part arranged to travel back and forth between them, a tension spring lying between said arms and extending from said head to a point beyond the pivotal axis of the lever and there connected to the said part of said motion transmitting member, thermostatic means for moving said motion transmitting member in one direction, and a pressure spring engaging said motion transmitting member for moving it in the opposite direction, said motion transmitting member being formed of pressed sheet metal and having a tongue bent out of the plane of the metal sheet to form a perch for said pressure spring, said motion transmitting member being also formed to provide pockets, and anti-friction members lying in said pockets and travelling along said abutments.

4. Thermostatic control mechanism, comprising a chambered casing provided with oppositely disposed spaced abutments, a generally U-shaped actuating lever provided with an operating head and having the free ends of its arms pivotally mounted upon one side of said abutments, a motion transmitting member pivotally mounted in the casing on the other side of said abutments and having a part arranged to travel back and forth between them, a tension spring lying between said arms and extending from said head to a point beyond the pivotal axis of the lever and there connected to the said part of said motion transmitting member, yieldable means for moving said motion transmitting member in one direction, and thermostatic means for moving it in the opposite direction.

5. Thermostatic valve mechanism, comprising a hollow casing provided with supply and discharge chambers separated by a valve seat, a valve cooperating with said seat, thermostatic operating means extending into one of said chambers, a main lever pivoted in one end of said chamber near said means and actuated thereby and extending toward the other end of said chamber, a valve actuating lever pivoted in the casing near the other end of said chamber and lying beside the main lever, a motion transmitting member pivotally mounted in said casing beyond the valve actuating lever and having a spring receiving portion located beyond its pivot, a tension spring extending from said portion to a remote point on the valve actuating lever, a pressure spring tending to move said motion transmitting member in one direction, and said main lever engaging said motion transmitting member to move it in the opposite direction.

6. Multiple leverage thermostatic control mechanism of the character described, comprising a chambered casing open at one side, two pairs of spaced abutments, one pair near each end of said casing and integral with its walls and having lever pivot supporting surfaces extending normal to the open side of said casing, enabling all of said surfaces to be machined accurately in one operation, main and secondary levers in said casing extending in opposite directions and lying generally parallel with each other, said levers having knife edge pivots bearing respectively one on each pair of said abutments, a motion transmitting member bearing directly on the casing and mounted for movement to opposite sides of said secondary lever pivot and adapted for operation by said main lever, yielding means acting on said motion transmitting member to maintain it in contact with said main lever, a tension spring extending from the free end of said secondary lever to said motion transmitting member, thermostatic means acting on said main lever, and an actuated device operated by said secondary lever.

JOSEPH A. CERNY.